3,577,473
METHOD FOR PRODUCING 5-ISOPROPYLIDENE-2-NORBORNENE

Tsuneyuki Nagase, Gohu Suzukamo, Fujio Masuko, and Yukio Yoneyoshi, Takatsuki-shi, Masami Fukao, Ibaragi-shi, and Masahiro Fujiwara, Takatsuki-shi, Japan, assignors to Sumitomo Chemical Company, Ltd., Osaka, Japan
No Drawing. Filed Oct. 4, 1968, Ser. No. 764,995
Claims priority, application Japan, Dec. 25, 1967, 42/68,966; Jan. 23, 1968, 43/3,900, 43/3,902; Jan. 24, 1968, 43/4,490
Int. Cl. C07c 5/24
U.S. Cl. 260—666
15 Claims

ABSTRACT OF THE DISCLOSURE 5-isopropylidene-2-norbornene is produced by subjecting cyclopentadiene and 2-methyl-3-butene-2-ol to Diels-Alder reaction to obtain $\alpha,\alpha$-dimethyl-5-norbornene-2-methanol (a mixture of endo-form and exo-form), dehydrating the $\alpha,\alpha$-dimethyl-5-norbornene-2-methanol to form a mixture of endo- and exo-5-isopropenyl-2-norbornene mixture containing, in part, 5-isopropylidene-2-norbornene, and contacting the mixture with an alkaline catalyst.

The 5-isopropylidene-2-norbornene is useful as a termonomer of a so-called ethylene-propylene terpolymer rubber, and the incorporation thereof results in a terpolymer having excellent curing characteristics.

BACKGROUND OF THE INVENTION

Field of the invention

This invention relates to 5-isopropylidene-2-norbornene and a process for producing the same. More particularly, this invention pertains to 5-isopropylidene-2-norbornene, which is a compound having excellent properties as a diene monomer for a terpolymer comprising ethylene, propylene and diene monomers (the terpolymer will be abbreviated as "EPDM" hereinafter), and to a process for the production thereof.

Description of the prior arts

As diene monomers for EPDM, many diene compounds, particularly non-conjugated diolefins, have been known. However, all these diene monomers cannot be said to be satisfactory.

That is, dicyclopentadiene, methylenenorbornene, methyltetrahydroindene, 1,4-hexadiene and cyclooctadiene have been well known as the termonomers in the EPDM. Of these, dicyclopentadiene and methylenenorbornene are high in polymerization activity but give EPDM markedly low in curing rate, which is an important property. Methyltetrahydroindene and cyclooctadiene are low in polymerization activity and hence are required to be used in large quantities. 1,4-hexadiene is higher in curing rate of the resulting EPDM than dicyclopentadiene but is not so favorable in polymerization activity. Thus, all of the conventional diene compounds are not sufficiently satisfactory as monomers for use in the production of EPDM.

The 5-isopropylidene-2-norbornene obtained in accordance with the present invention is a markedly excellent diene monomer in that it not only shows no polymerization-inhibiting action in the production of EPDM, but also gives EPDM comparable in curing rate to an ethylene-propylene-5-ethylidene-2-norbornene terpolymer, which has heretofore been known as EPDM having an extremely high curing rate. Concerning the above, the applicant has already filed Japanese patent applications, which are now pending as Japanese patent application Nos. 42/62,791 and 42/62,792.

N. P. Sapov reports in "Zhur. Obschei Khim.," 25, 2082–2090 (1955) that 5-isopropylidene-2-norbornene was obtained in a yield of about 60% by dehydrating $\alpha,\alpha$-dimethyl-5-norbornene-2-methanol with fifty percent excess of acetic anhydride in sealed tube for 6 hrs. at 200° C. According to experiments carried out by the present inventors, however, the product obtained by N. P. Sapov is not the desired 5-isopropylidene-2-norbornene but is 5-isopropenyl-2-norbornene, which is an isomer of 5-isopropylidene-2-norbornene, his experimental results are erroneous.

U.S. Pat. 3,151,173 discloses a process in which an alkylnorbornadiene is subjected to rearrangement reaction using an acid catalyst to obtain a 5-alkylidene-2-norbornene. However, the United States patent does not describe concretely the physical and the chemical properties of 5-isopropylidene-2-norbornene. Further, the above process cannot be said to be advantageous in view of difficulties encountered in the synthesis of isopropylnorbornadiene, and of complexness of the reaction product due to acid rearrangement.

N. P. Sapov describes in the same report, a process for producing $\alpha,\alpha$-dimethyl-5-norbornene-2-methanol. That is, he reports that $\alpha,\alpha$-dimethyl-5-norbornene-2-methanol is obtained by subjecting cyclopentadiene and methyl acrylate to Diels-Alder reaction to form methyl 2-norbornene-5-carboxylate and then effecting the Grignard reaction of the ester with methyl iodide. However, the above process for producing $\alpha,\alpha$-dimethyl-5-norbornene-2-methanol has such drawbacks that the reaction of steps are difficult, the starting materials are expensive, and much care should be taken in the operations. Accordingly, the above-mentioned process reported by N. P. Sapov cannot be said to be advantageous from the industrial standpoint.

In addition, several literatures disclose 5-isopropenyl-2-norbornene. These literatures, however, are entirely silent on the stereoisomers of 5-isopropenyl-2-norbornene. That is, it is considered that, in the case of 5-isopropenyl-2-norbornene, there exist stereoisomers of two kinds; endo-form and exo-form, but these stereoisomers are not considered in these literatures. Moreover, 5-isopropenyl-2-norbornene has been obtained by the Diels-Alder reaction of cyclopentadiene with isoprene [cf. A. F. Plate and N. A. Belikova: "Zhur. Obschei. Khim.," 30, 3953 (1960), and U.S. Pat. 2,752,403]. According to the above process, however, the yield of 5-isopropenyl-2-norbornene is low and many by-products such as methyltetrahydroindene, isoprene dimers and polymers are produced in addition to the codimer. According to experiments of the present inventors, 5-isopropenyl-2-norbornene synthesized by this process was substantially of the endo-form (endo/exo≑9:1)

SUMMARY OF THE INVENTION

In an attempt to advantageously produce 5-isopropylidene-2-norbornene, the present inventors made various studies. As the result, the inventors have found that both endo-$\alpha,\alpha$-dimethyl-5-norbornene-2-methanol and exo-$\alpha,\alpha$-dimethyl-5-norbornene-2-methanol give, according to liquid phase dehydration or to gas phase dehydration a mixture of 5-isopropylidene-2-norbornene and endo- or exo-5-isopropenyl-2-norbornene, and when this mixture is contacted with an alkaline catalyst, 5-isopropylidene-2-norbornene can be easily obtained.

The inventors have further found that 5-isopropenyl-2-norbornene, which is obtained by the Diels-Alder reaction of cyclopentadiene with isoprene, also rearranges easily to give 5-isopropylidene-2-norbornene.

The inventors have still further found that $\alpha,\alpha$-dimethyl-5-norbornene-2-methanol is obtained in the form of an endo-exo mixture by reacting cyclopentadiene or dicyclopentadiene with 2-methyl-3-butene-2-ol (hereinafter referred to as "isoprene alcohol").

An object of the present invention is to provide a diene monomer capable of giving EPDM having excellent curing characteristics.

Another object of the invention is to provide a process for advantageously producing the above-mentioned diene monomer.

Other objects will become clear from the description made below.

In order to achieve the above objects, the present invention provides 5-isopropylidene-2-norbornene.

The invention further provides a process for producing 5-isopropylidene-2-norbornene, characterized by contacting endo- or exo-5-isopropenyl-2-norbornene with alkaline catalysts.

The invention further provides a process for preparing 5-isopropylidene-2-norbornene, characterized by dehydrating endo- or exo-α,α-dimethyl-5-norbornene-2-methanol to form a mixture comprising endo- or exo-5-isopropenyl-2-norbornene and, in part, 5-isopropylidene-2-norbornene, and then contacting said mixture with alkaline catalysts to rearrange the double bond of the isopropenyl group.

The invention still further provides a process for producing 5-isopropylidene-2-norbornene, characterized by reacting cyclopentadiene or dicyclopentadiene with isoprene alcohol to form a mixture of endo- and exo-α,α-dimethyl-5-norbornene-2-methanols, dehydrating said mixture to obtain a mixture comprising 5-isopropylidene-2-norbornene, in part, and endo- and exo-5-isopropenyl-2-norbornenes, and then contacting the mixture with an alkaline catalyst to rearrange the double bond of the isopropenyl group.

The reactions according to the present invention may be represented by the following reaction equations:

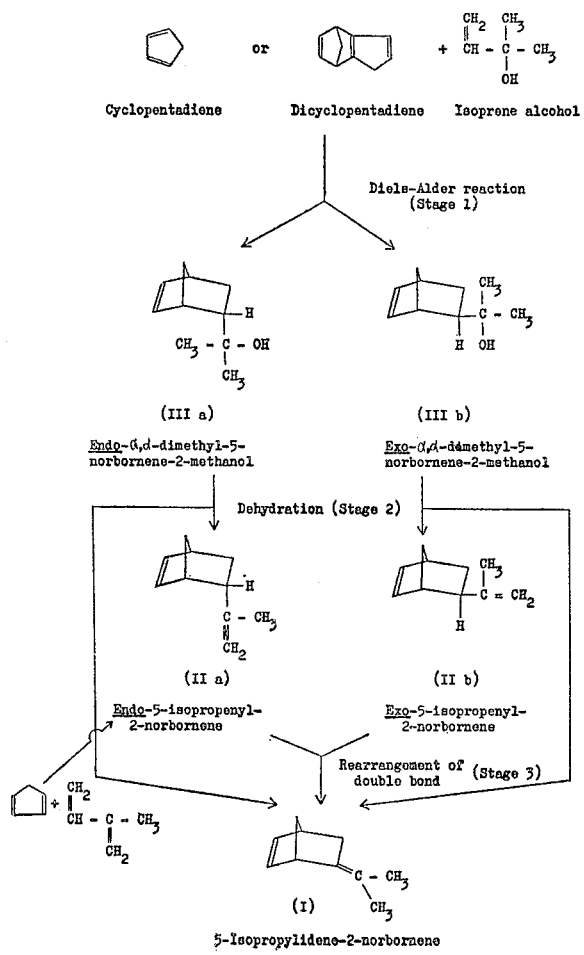

Now, the present process is explained below in the order of synthesis courses.

STAGE 1

Diels-Alder reaction of cyclopentadiene or dicyclopentadiene with isoprene alcohol Isoprene alcohol is contacted at an elevated temperature with cyclopentadiene or dicyclopentadiene, whereby α,α-dimethyl-5-norbornene-2-methanol (IIIa and IIIb) is produced. This reaction may be effected under the ordinary Diels-Alder reaction conditions. However, isoprene alcohol is relatively low in activity as dienophile, and hence difficulty reacts at normal temperature. Ordinarily, therefore, the reaction is desirably effected in a closed vessel for 2–20 hours at a temperature within the range of about 150° to 250° C., preferably 175° to 230° C.

Dicyclopentadiene is used in order to form cyclopentadiene by the decomposition thereof. When this compound is to be utilized, a temperature condition above the decomposition temperature of dicyclopentadiene, i.e. a temperature of 180°–250° C., is employed. If the temperature is higher than the above range, the loss of the cyclopentadiene component becomes greater due to polymerization or the side reaction. Since such side reaction takes place even at a temperature within the above-mentioned range, it is desirable to effect the reaction in the presence of a polymerization inhibitor such as hydroquinone or the like.

Isoprene alcohol and cyclopentadiene (including one formed by the decomposition of dicyclopentadiene) react in a molar ratio of 1:1 to form α,α-dimethyl-5-norbornene-2-methanol, though the molar ratio of the two is freely variable in the reaction system. As mentioned above, however, the cyclopentadiene component tends to bring about side reactions, and therefore the use of excess isoprene alcohol is more desirable than the use of excess cyclopentadiene component. In this case isoprene alcohol has been used in excess, the recovery and reuse thereof are easy and accompany no trouble at all.

It is, of course, preferable that the reaction be effected in the presence of a solvent inert to Diels-Alder reaction, though the reaction may successfully be carried out even in the absence of solvent. As such solvent, there is used, for example, a hydrocarbon such as hexane or heptane; an aromatic hydrocarbon such as benzene or toluene; or an alcohol such as methanol or ethanol.

Further, it is needless to say that closed vessel is preferably flushed with an inert gas such as nitrogen.

After completion of the reaction, the content of the vessel is taken out and is then purified by distillation, whereby the desired substance can be isolated.

The α,α-dimethyl-5-norbornene-2-methanol obtained in the above reaction is a mixture of endo-form (IIIa) and exo-form (IIIb). The separation of the endo-form and the exo-form is achieved only by gas chromatography, and the ratio of the endo-form (IIIa) to the exo-form (IIIb) is 90:10. If the obtained α,α-dimethyl-5-norbornene-2-methanol is to be used in the subsequent Stage 2, the mixture may be used without separating the endo-form from the exo-form.

According to the aforesaid process reported by N. P. Sapov, in which α,α-dimethyl-5-norbornene-2-methanol is prepared from cyclopentadiene and methyl acrylate, the ratio of the endo-form to the exo-form is 40:60.

STAGE 2

Dehydration of α,α-dimethyl-5-norbornene-2-methanol (IIIa) or (IIIb):

The α,α-dimethyl-5-norbornene-2-methanol obtained at Stage 1 is subsequently subjected to dehydration reaction.

Since the α,α-dimethyl-5-norbornene-2-methanol is a tertiary alcohol, the formation of an unsaturated compound by dehydration reaction is relatively easy. In accordance with the present process, the product differs in form depending on the dehydration process. That is, when dehydrated according to the gas phase process using an alumina catalyst, exo-α,α-dimethyl-5-norbornene-2-methanol (IIIb) gives only exo-5-isopropenyl-2-norbornene. Further, when dehydrated according to the same process as above, endo-α,α-dimethyl-5-norbornene-2-methanol (IIIa) gives neither endo-5-isopropenyl-2-norbornene nor 5-isopropylidene-2-norbornene but an intramolecularly bonded inner ether compound. On the other hand, when dehydrated according to the liquid phase process or to the gas phase process using other gas phase dehydration catalyst than alumina catalyst, endo- or exo-α,α-dimethyl-5-norbornene-2-methanol gives endo- or exo-5-isopropenyl-2-norbornene and 5-isopropylidene-2-norbornene.

In the present invention, the α,α-dimethyl-5-norbornene-2-methanol is used, in practice, in the mixture of the endo-form (IIIa) and the exo-form (IIIb). Accordingly, the products obtained after dehydration are 5-isopropylidene-2-norbornene (I) and endo- and exo-5-isopropenyl-2-norbornenes (IIa) and (IIb). However, only when the dehydration is effected according to the gas phase process using an alumina catalyst, exo-α,α-dimethyl-5-norbornene-2-methanol (IIIb) is selectively dehydrated to give only exo-5-isopropyenl-2-norbornene (IIb). According to the above process, exo-5-isopropenyl-2-norborne (IIb) containing no endo-isomer (IIa) can be easily obtained.

In the alumina dehydration of α,α-dimethyl-norbornene-methanol, only the exo-alcohol is dehydrated, and the endo-alcohol becomes an inner ether as seen in the following equation:

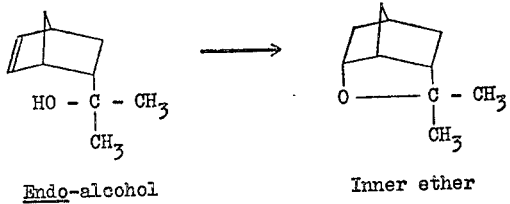

Endo-alcohol      Inner ether

Accordingly, exo-5-isopropenyl-2-norbornene can be separated from the ether by distillation.

For the synthesis of exo-5-isopropenyl-2-norbornene, it is desirable to adopt Grignard process and to use an exo-rich alcohol (endo/exo=4/6).

In the dehydration of α,α-dimethyl-5-norbornene-2-methanol, there are employed such ordinary processes and catalysts as those adopted in the synthesis of unsaturated compounds by the dehydration of tertiary alcohols. That is, the dehydration processes are roughly divided into (1) the liquid phase process and (2) the gas phase process.

The catalysts employed in the liquid phase process include mineral acids, e.g. sulfuric acid, phosphoric acid, polyphosphoric acid and phosphoric anhydride; organic acids, e.g. oxalic acid; and acid chloride, e.g. thionyl chloride and the like; and inorganic acid salts, e.g. anhydrous cupric sulfate (potassium by sulfate and zinc chloride. However, the use of inorganic acid salts is preferable. α,α-dimethyl-5-norbornene-2-methanol is charged with 1/10–1/5 wt. percent of such acid catalyst as mentioned above and is then subjected to heating, dehydration and distillation.

The solvents employed in the liquid phase process are those which are inert to the reaction, such as xylene, toluene and the like. When α,α-dimethyl-5-norbornene-2-methanol having an endo (IIIa) to exo (IIIb) ratio of 40:60 is dehydrated in a xylene solution in the presence of anhydrous cupric sulfate as a catalyst, there is obtained a reaction mixture comprising 40–50% of exo-5-isopropenyl-2-norbornene (IIb), 30–40% of 5-isopropylidene-2-norbornene (I), and a small amount of endo-5-isopropenyl-2-norbornene (IIa). Further, when α,α-dimethyl-5-norbornene-2-methanol having an endo to exo ratio of 90:10 is dehydrated in a xylene solution in the presence of anhydrous cupric sulfate as a catalyst, there is obtained a reaction mixture comprising 55–60% of endo-5-isopropenyl-2-norbornene (IIa), 30–40% of 5-isopropyidene-2-norbornene (I), and a small amount of exo-5-isopropenyl-2-norbornene (IIb).

In the gas phase dehydration, an active alumina catalyst is used.

The dehydration reaction according to the gas phase process using an alumina catalyst is carried out by charging the catalyst into a reaction tube and introducing α,α-dimethyl-5-norbornene-2-methanol, while maintaining the temperature at 100°–200° C., preferably 140°–150° C. In the gas phase dehydration using the alumina catalyst, exo-α,α-dimethyl-5-norbornene-2-methanol (IIIb) is dehydrated to form exo-5-isopropenyl-2-norbornene (IIb). That is, when α,α-dimethyl-5-norbornene-2-methanol having an endo to exo ratio of 90:10 is used, there is obtained, in the reaction mixture, exo-5-isopropenyl-2-norborne (IIa) in a yield of 10%. Further, when α,α-dimethyl-5-bornene-2-methanol having an endo to exo ratio of 40:60 is used, there is obtained, in the product, exo-5-isopropenyl-2-norbornene (IIb) in a yield of 60%.

The endo- and exo-5-isopropenyl-1-cnorbornene (IIa) and (IIb), and the 5-isopropylidene-2-norbornene (I) can be isolated one another only by gas chromatography. Further, their structures can be individually confirmed and determined according to nuclear magnetic resonance spectra, infrared spectra and mass spectra.

STAGE 3

Rearrangment of doube bond of 5-isopropenyl-2-norbornene

In accordance with the present process, the 5-isoproprylidene-2-norbornene (I) is produced quantitatively and in a short time by bringing endo- or exo-5-isopropenyl-2-norbornene (IIa) or (IIb), which is obtained either at Stage 2 or by the Diels-Alder reaction of cyclopentadiene with isoprene, or a mixture thereof, into contact with an alkaline catalyst thereby rearranging the double bond of the isoprepenyl group.

The endo- and exo-5-isopreprenyl-2-norbornene (IIa) and (IIb) employed at this Stage 3 are not required to be single substances but may be individual mixtures thereof. Further, the 5-isopropenyl-2-norbornene obtained at Stage 2 contains 5-isopropylidene-2-norbornene, in general. Even such 5-isopropenyl-2-norbornene may, of course, be used.

In effecting the rearrangement of the double bond, the endo- or exo-5-isopropenyl-2-norbornene is contacted, by stirring or the like operation, with an alkaline catalyst in the presence or absence of a solvent. Examples of the alkaline catalyst employed as a rearrangement catalyst include an alkali metal, e.g. lithium, sodium or potassium. Such alkali metal is used in a state dispersed on a carrier. In dispersing the metal on a carrier, the carrier is heated in a nitrogen atmosphere to thoroughly exclude water, and then the metal is gradually added and dispersed while stirring the carrier at above the melting point of the metal, e.g. at 150°–160° C. in the case of sodium. Particularly, the use of alkali metals dispersed on porous carriers such as alumina, silica gel and the like is preferable. In addition, alkali metal hydroxides such as caustic sida, caustic potash, etc., or alkali metal alcoholates such as lithium alcoholate, sodium alcoholate, potassium alcoholate, etc. may also be used as alkaline catalysts. In this case, the alkali metal alcoholates may also be employed in the presence of, as a solvent, such as aprotic dipolar solvent as dimethyl sulfoxide.

In case alkali metals, particularly those dispersed on carriers, are used as catalysts, care must be taken so as to avoid moisture. When the rearrangement is carried out in a state completely shielded from moisture, the reaction time can be shortened.

The amount of catalyst employed is not particularly restricted, but is 1/100–1/5 equivalent, preferably 1/10–1/5 equivalent, based on the starting material, in general.

The reaction temperature is 15°–35° C., preferably 20°–30° C., if no solvent is used. When a solvent is used, the reaction is effected at or below the boiling point of the solvent. Particularly when catalysts prepared by dispersing alkali metals on carriers are used in the absence of solvent, the reaction is carried out at 15°–35° C., preferably 20–30° C.

The reaction time is followed by gas-chromatography. Generally, the reaction time is a few minutes to two hours. Using the alkaline metal catalysts dispersed on carriers, the reaction temperature is elevated and the reaction time is made longer, the yield of the desired 5-isopropylidene-2-norbornene rather decreases. This is because the by-production of a tricyclic compound, i.e. isopropenyl nortoricyclene, is liable to be obtained due to the rearrangement or isomerization of once formed 5-isopropylidene-2-norbornene. In case an alkali metal is used, the rearrangement terminates in about 30 minutes. After completion of the rearrangement, the catalyst is removed (in the case of Na-Al$_2$O$_3$, it is separated by filtration, or Na is decomposed by addition of alcohol) and pure product is obtained by distillation.

When the thus obtained 5-isopropylidene-2-norbornene is copolymerized with ethylene and propylene, it is possible to obtain EPDM having excellent curing characteristics.

As mentioned above, according to the present invention, 5-isopropyidene-2-norbornene and exo-5-isopropenyl-2-norbornene, which are novel diene components capable of giving EPDM having excellent curing characteristics, can be obtained in high yields.

The present invention is illustrated in further detail below with reference to examples.

EXAMPLES

Example 1

Stage 1–a.—Into a 500 ml. stainless steel-made, induction stirring-type autoclave were charged 92.5 g. of cyclopentadiene, 120.5 g. of isoprene alcohol and 1.4 g. of hydroquinone. The autoclave was closed and was flushed with nitrogen. Subsequently, the mixture was allowed to react with stirring at 200°–220° C. for 6 hours. After cooling the autoclave, the content was taken out and was fractionated under reduced pressure.

As the result, 65.9 g. of unreacted isoprene alcohol was recovered, and 49.2 g. of α,α-dimethyl-5-norbornene-2-methanol (endo/exo=9/1) was obtained as a liquid having a boiling point of 85°–87° C. (20 mm. Hg).

Stage 1–b.—Into a 500 ml. stainless steel-made, induction stirring-type autoclave were charged 66 g. of cyclopentadiene, 129 g. of isoprene alcohol, and 1.0 g. of hydroquinone. The autoclave was closed and was flushed with nitrogen. Thereafter, the mixture was allowed to react with stirring at 200°–220° C. for 8 hours. After cooling the autoclave, the content was taken out, and unreacted isoprene alcohol (82.5 g.) was recovered under reduced pressure (20 mm. Hg). Subsequently, fractionation was effected to obtain 38.2 g. of α,α-dimethyl-5-norbornene-2-methanol (endo/exo=9/1) as a fraction having a boiling point of 85°–87° C.

State 1–c.—Into a 500 ml. stainless steel-made autoclave were charged 66 g. of dicyclopentadiene, 129 g. of isoprene alcohol, and 1.0 g. of hydroquinone. The autoclave was closed and was flushed with nitrogen. Thereafter, the mixture was allowed to react with stirring at 220°–230° C. for 6 hours. After cooling the autoclave, the content was taken out, and unreacted isoprene alcohol (78.3 g.) was recovered under reduced pressure (20 mm. Hg). Subsequently, fractionation was effected to obtain 30.8 g. of α,α-dimethyl-5-norbornene-2-methanol (endo/exo=9/1) as a fraction having a boiling point of 85°–87° C.

Stage 2–a.—Into a flask fitted with a stirrer and a reflux condenser were charged 30 g. of α,α-dimethyl-5-norbornene-2-methanol (endo/exo=9/1), 30 ml. of anhydrous xylene, and 10 g. of anhydrous cupric sulfate. The mixture was heated and refluxed with stirring for 6 hours in a nitrogen atmosphere. After cooling cupric sulfate was removed by filtration, and was washed with ether. The ether-containing filtrate was washed with water and was dried with anhydrous sodium sulfate. After removal of the ether and xylene, residual oily substance was distilled under reduced pressure to yield 17.5 g. of a product having a boiling point of 62°–64° C./20 mm. Hg. According to gas chromatographical analysis, it was found that the product was composed of 51.8% of endo-5-isopropenyl-2-norbornene, 44.5% of isopropylidene-2-norbornene, and 3.7% of exo-5-isopropenyl-2-norbornene.

Stage 2–b.—6.5 g. of potassium bisulfate was added to 17.2 g. of α,α-dimethyl-5-norbornene-2-methanol (endo/exo=9:1). The mixture was dehydrated while distilling the under reduced pressure (100 mm. Hg) at 120°–140° C. The distillate was dried with anhydrous sodium sulfate and was redistilled under reduced pressure to yield 13.8 g. of a product having a boiling point of 62°–64° C./20 mm. Hg.

According to gas chromatographical analysis, it was found that the product was a mixture containing 63.3% of endo-5-isopropenyl-2-norbornene and 36.7% of 5-isopropylidene-2-norbornene.

Stage 2–c.—10 wt. percent of anhydrous cupric sulfate was coated on active alumina (8–14 mesh), and the composite was dried at 350° C. for 5 hours in a nitrogen atmosphere to prepare a catalyst. 30 g. of this catalyst was charged into a glass tube having an inner diameter of 7 mm. and a length of 45 cm. The reaction tube was heated with nicrome wire to maintain the inner temperature at 140°–150° C. Into the reaction tube, gaseous α,α-dimethyl-5-norbornene-2-methanol (endo/exo=9/1) was introduced through the top in a nitrogen atmosphere under a reduced pressure of 20 mm. Hg. A receiver attached to the bottom of the reaction tube was cooled with Dry Ice-acetone, and the resulting oily substance was collected therein. The collected oily substance was distilled under reduced pressure to obtain a liquid having a boiling point of 62°–64° C./20 mm. Hg. From 30 g. of α,α-dimethyl-5-norbornene-2-methanol, 24.3 g. of the liquid was obtained. According to gas chromatography, it was found that the liquid was composed of 47.7% of 5-isopropylidene-2-norbornene and 52.3% of endo-5-isopropenyl-2-norbornene.

Stage 3.—200 g. of active alumina (60–200 mesh) was charged into a 500 ml. four-necked flask with a thermometer, an alkali metal-charging inlet, a nitrogen-inlet tube and a stirrer, and was dried at 350° C. for 3 hours with stirring in a nitrogen atmosphere. After the drying, the temperature was lowered to 150°–160° C., and 20 g. of metallic sodium was charged therein little by little in a period of about 30 minutes. After the total amount of metallic sodium had been charged, the mixture was stirred, until the temperature was lowered to room temperature, to obtain 220 g. of a sodium-alumina catalyst.

On the other hand, 5.0 g. of anhydrous 5-isopropenyl-2-norbornene (endo/exo=89.1/10.8) was charged into a 20 ml. flask fitted with the stopper. The sodium-alumina catalyst prepared in mentioned above was added in an amount of 0.86 g. (1/10 equivalent for sodium), and the mixture was allowed to react with stirring at room temperature in nitrogen atmosphere. During the reaction, samples were taken up every ten minutes. These samples were gas chromatographically analyzed to find that the proportions of the resulting 5-isopropylidene-2-norbornene and the starting material were as follows:

| Time | Starting material, percent | | Rearrangement product, percent |
|---|---|---|---|
| | Endo-form | Exo-form | |
| 10 minutes | 4.7 | 2.6 | 92.7 |
| 20 minutes | 0 | 0.8 | 99.2 |
| 30 minutes | 0 | 0 | 99.9 |

The produced 5-isopropylidene-2-norbornene had a boiling point of 58°–59° C./18 mm. Hg, and showed $n_D^{19.6}$ 1.4943. The product was confirmed with mass spectrum, infrared absorption spectrum and nuclear magnetic resonance spectrum.

Example 2

Diels-Alder reaction of cyclopentadiene with isoprene alcohol.—Into a 500 ml. stainless steel induction stirring-type autoclave were charged 66 g. of cyclopentadiene, 86 g. of isoprene alcohol, and 200 ml. of xylene. The autoclave was then closed and was flushed with nitrogen. Thereafter, the mixture was stirred at 220°:230° C. for 6 hours. After cooling, the content was taken out and was fractionated under reduced pressure.

As the result, 32 g. of unreacted isoprene alcohol was recovered, and 42.5 g. of α,α-dimethyl-5-norbornene-2-methanol was obtained.

Example 3

Dehydration of α,α - dimethyl - 5 - norbornene - 2-methanol.—36 g. of active alumina (8–14 mesh) was charged into a glass-tube, an inner diameter of 13 mm. and a length of 50 cm. The reaction tube was heated with Nichrome wire to maintain the inner temperature of 150° C. Into the reaction tube, 0.5 g./min. of α,α-dimethyl-5-norbornene-2-methanol (endo/exo=4/6) was continuously dropped through the top in a nitrogen atmosphere. A receiver attached to the bottom of the reaction tube was cooled with Dry Ice-acetone, and the resulting oily substance was collected. The collected oily substance was distilled under reduced pressure to yield a product having a boiling point of 79.5°–80.5° C./50 mm. Hg and $n_D^{19.7}$ 1.4836. This product showed M+: 134 according to mass spectrum, and was confirmed to be exo-5-isopropenyl-2-norbornene according to nuclear magnetic resonance spectrum and infrared absorption spectrum.

From 96 g. of starting material, 42.9 g. of exo-5-isopropenyl-2-norbornene was obtained.

Example 4

Dehydration of α,α - dimethyl - 5 - norbornene - 2-methanol.—α,α-Dimethyl - 5 - norbornene - 2 - methanol (endo/exo=9/1) was treated in the same manner as in Example 3, and the product was gas chromatographically analyzed to find that 9.2% of exo-5-isopropenyl-2-norbornene had been formed.

Example 5

Dehydration of α,α - dimethyl - 5 - norbornene - 2-methanol.—Into a three necked flask fitted with a stirrer and a reflux condenser were placed 30 g. of α,α-dimethyl-5-norbornene-2-methanol (endo/exo=4/6) 30 ml. of anhydrous xylene and 10 g. of anhydrous cupric sulfate. The mixture was heated and refluxed with stirring for 6 hours in a nitrogen atmosphere. After cooling the mixture, cubic sulfate was separated by filtration, and then washed with ether. The ether-containing filtrate was washed with water and was dried with anhydrous sodium sulfate. After removal of the ether and the xylene residual oily substance was distilled under reduced pressure to yield 22.0 g. of a colorless liquid having a boiling point of 62°–64° C./24 mm. Hg.

The liquid was gas chromatographically analyzed to find that it contained 48.4% of exo-5-isopropenyl-2-norbornene and 37.7% of 5-isopropylidene-2-norbornene.

Example 6

Dehydration of α,α - dimethyl - 5 - norbornene - 2-methanol.—10 g. of α,α - dimethyl - 5 - norbornene - 2-methanol (endo/exo=4/6) and 10 g. of acetic anhydride were charged into a sealed tube, and the mixture was heated at 190° C. for 4 hours. After neutralizing with a 20% aqueous caustic potash solution, the reaction mixture was extracted with ether. The ether layer was dried and then ether was removed by distillation.

The residue was distilled under reduced pressure to yield 3.1 g. of exo-5-isopropenyl-2-norbornene having a boiling point of 61°–64° C./20 mm. Hg.

Example 7

Dehydration of α,α - dimethyl - 5 - norbornene - 2-methanol.—10 g. of α,α - dimethyl - 5 - norbornene - 2-methanol (endo/exo=4/6) was dissolved in 26 g. of anhydrous pyridine. To the solution, 15.87 g. of thionyl chloride was gradually added in small portions, while stirring and cooling the solution with ice. After the addition had been completed, the mixture was allowed to stirr for 10 hours. The mixture was poured slowly into ice water, was extracted with ether, the ether layer was washed with a 10% aqueous sodium carbonate solution and was then dried with anhydrous sodium sulfate. Subsequently, the ether was removed by distillation, and the residue was distilled under reduced pressure to yield 3.9 g. of exo-5-isopropenyl-2-norbornene having a boiling point of 52°–53° C./11 mm. Hg.

Example 8

Dehydration of α,α - dimethyl - 5 - norbornene - 2-methanol.—The mixture of 5.07 g. of α,α-dimethyl-5-norbornene-2-methanol (endo/exo=4/6) and 20 g. of polyphosphoric acid was stirred at 80° C. for 30 minutes. The reaction mixture was poured into ice water and was extracted with ethyl acetate. After washing with water, the extract was dried, and then ethyl acetate was removed by distillation. Subsequently, the residue was distilled under reduced pressure to yield 1.35 g. of exo-5-isopropenyl-2-norbornene having a boiling point of 64° C./20 mm. Hg.

Example 9

Isomerization of 5 - isopropenyl - 2 - norbornene to 5-isopropylidene - 2 - norbornene.—5.0 g. of exo - 5 - isopropenyl - 2 - norbornene was placed into a 20 ml. flask fitted with the stopper. 0.86 g. of the sodium-alumina catalyst prepared at Stage 3 of Example 1 was added thereto in a nitrogen atmosphere. Subsequently, the mixture was stirred at room temperature by means of an electromagnetic stirrer. The course of isomerization was analyzed by gas chromatography. The result was as follows:

| Time | Exo-5-isopropenyl-2-norbornene, percent | 5-isopropylidene-2-norbornene, percent |
|---|---|---|
| 10 minutes | 10.1 | 89.9 |
| 20 minutes | 7.2 | 92.8 |
| 30 minutes | 0.7 | 99.3 |

Example 10

Isomerization of 5-isopropenyl-2-norbornene to 5-isopropylidine-2-norbornene.—8.05 g. of endo-5-isopropenyl-2-norbornene was placed into a 35 ml. flask fitted with the stopper. To the flask, 1.4 g. of the sodium-alumina catalyst prepared at Stage 3 of Example 1 was added in a nitrogen atmosphere. Subsequently, the mixture was stirred at room temperature by means of an electromagnetic stirrer. After 10 minutes, the reaction product was gas chromatographically analyzed to find that 99.5% of the endo-5-isopropenyl-2-norbornene had been isomerized to 5-isopropylidene-2-norbornene.

Example 11

Isomerization of 5-isopropenyl-2-norbornene to 5-isopropylidene-2-norbornene.—20 g. of endo-5-isopropenyl-2-norbornene was placed into a 50 ml. flask fitted with the stopper. 3.43 g. of the sodium-alumina catalyst prepared at Stage 3 of Example 1 was added in a nitrogen atmosphere. Subsequently, the mixture was stirred at room temperature by means of an electromagnetic stirrer for 40 minutes, whereby 98.5% of the endo-5-isopropenyl-2-norbornene was isomerized.

Example 12

Isomerization of 5-isopropenyl-2-norbornene to 5-isopropylidene-2-norbornene.—8.05 g. of endo-5-isopropenyl-2-norbornene was charged into a 35 ml. Erlenmeyer flask. To the flask, 1.4 g. of the sodium-alumina catalyst prepared at Stage 3 of Example 1 was added in a nitrogen atmosphere. Subsequently, the mixture was stirred by means of an electromagnetic stirrer at 50° C. for 65 hours to obtain 7.9 g. of a liquid having $n_D^{23}$ 1.4921. The liquid was analyzed by gaschromatography to find that it contained 86.4% of 5-isopropylidene-2-norbornene and 11.4% of isopropenyl nortoricyclene.

Example 13

Isomerization of 5-isopropenyl-2-norbornene to 5-isopropylidene-2-norbornene.—Into a 50 ml. three-necked flask fitted with a stirrer, 10 g. of endo-5-isopropenyl-2-norbornene, 20 g. of dimethyl sulfoxide and 4.5 g. of caustic potash were charged, and the mixture was heated with stirring at 112°–115° C.

The reaction was followed by gaschromatography and the results as shown below.

| Time, hours: | Isomerization product, percent |
|---|---|
| 10 | 23 |
| 30 | 58 |
| 50 | 85 |

Example 14

Isomerization of 5-isopropenyl-2-norbornene to 5-isopropylidene-2-norbornene.—Into a 100 ml. three-necked flask fitted with a stirrer, 8.6 g. of endo-5-isopropenyl-2-norbornene, 25 g. of dimethyl sulfoxide and 4.0 g. of potassium ethylate were charged, and the mixture was heated with stirring at 112°–115° C. The reaction was followed by gaschromatography and the results as shown below.

| Time, hours: | Isomerization product, percent |
|---|---|
| 10 | 11.3 |
| 20 | 53.5 |
| 40 | 86.6 |

Referential Example 1

Into a 50 ml. three-necked flask fitted with a stirrer were charged 10 g. of endo-5-isopropenyl-2-norbornene and 10 g. of a paste prepared by pulverizing 40% of caustic potash in benzene. Subsequently, the mixture was heated with stirring at 112°–115° C., but 5-isopropenyl-2-norbornene was not isomerized and the starting material was recovered.

What we claim is:

1. A process for producing 5-isopropylidene-2-norbornene which comprises contacting endo-5-isopropenyl-2-norbornene, exo-5-isopropenyl-2-norbornene or a mixture thereof with an alkali catalyst selected from the group consisting of
   (1) an alkali metal dispersed on a carrier;
   (2) an alkali metal hydroxide in an aprotic dipolar solvent; and
   (3) an alkali metal alkoxide in an aprotic dipolar solvent
at a temperature of 10° C. to 200° C.

2. A process according to claim 1, wherein the alkali metal is sodium dispersed on a porous alumina or silica gel.

3. A process according to claim 1, wherein the alkali metal hydroxide is potassium hydroxide.

4. A process according to claim 1, wherein the alkali metal alkoxide is potassium ethoxide.

5. A process according to claim 1, wherein the reaction is carried out in a nitrogen atmosphere or in the presence of dimethyl sulfoxide.

6. A process for producing 5-isopropylidene-2-norbornene which comprises contacting endo-α,α-dimethyl-5-norbornene - 2 - methanol, exo - α,α - dimethyl-5-norbornene-2-methanol or a mixture thereof with a dehydration catalyst selected from the group consisting of inorganic acids, organic acids, acid anhydrides, salts of inorganic acids and alumina to yield endo-5-isopropenyl-2-norbornene, exo-5-isopropenyl-2-norbornene or a mixture thereof and contacting the resultant endo-5-isopropenyl-2-norbornene, exo-5-isopropenyl - 2 - norbornene or the mixture thereof with an alkaline catalyst selected from the group consisting of alkali metals, alkali metal hydroxides and alkali metal alkoxides at a temperture of 10°–200° C. to yield 5-isopropylidene-2-norbornene.

7. A process according to claim 6, wherein the inorganic acid is polyphosphoric acid.

8. A process according to claim 6, wherein the acid anhydride is acetic anhydride.

9. A process according to claim 6, wherein the salts of inorganic acids are anhydrous cupric sulfate or potassuim bisulfate.

10. A process for producing 5-isopropylidene-2-norbornene which comprises contacting exo-α,α-dimethyl-5-norbornene-2-methanol with alumina at a temperature of 100°–200° C. in a gas phase to yield exo-5-isopropenyl-2-norbornene and contacting the resultant exo-5-isopropenyl-2-norbornene with an alkaline catalyst selected from the group consisting of alkali meals, alkali metal hydroxides and alkali metal alkoxides at a temperature of 10°–200° C. to yield 5-isopropylidene-2-norbornene.

11. A process for producing 5-isopropylidene-2-norbornene, which comprises contacting endo-α,α-dimethyl-5-norbornene-2-methanol, exo - α,α - dimethyl - 5 - norbornene-2-methanol or a mixture thereof with a dehydration catalyst selected from the group consisting of inorganic acids, organic acids, acid anhydrides, salts of inorganic acids and alumina to yield a mixture comprising endo-5-sopropenyl - 2 - norbornene, exo-5-isopropenyl-2-norbornene or a mixture thereof and 5-isopropylidene-2-norbornene, and contacting mixture with an alkaline catalyst selected from the group consisting of alkali metals, alkali metal hydroxides and alkali metal alkoxides at a temperature of 10°–200° C. to yield 5-isopropylidene-2-norbornene.

12. A process for producing 5-isopropylidene-2-norbornene which comprises reacting cyclopentadiene or dicyclopentadiene with isoprene alcohol to yield a mixture of endo-α,α-dimethyl-5-norbornene - 2 - methanol and exo - α,α - dimethyl-5-norbornene-2-methanol, contacting the mixture with a dehydration catalyst selected from the group consisting of inorganic acids, organic acids, acid anhydrides, salts of inorganic acids and alumina to yield a mixture of endo-5-isopropenyl-2-norbornene, exo-5-isopropenyl-2-norbornene and 5 - isopropylidene-2-norbornene and contacting said mixture with an alkaline catalyst selected from the group consisting of alkali metals, alkali metal hydroxides and alkali metal alkoxides at a temperature of 10°–200° C. to yield 5-isopropylidene-2-norbornene.

13. A process according to claim 1, wherein the aprotic dipolar solvent is dimethyl sulfoxide.

14. The process according to claim 1, wherein the starting material is endo-5-isopropenyl-2-norbornene.

15. The process according to claim 1, wherein the starting material is exo-5-isopropenyl-2-norbornene.

References Cited

UNITED STATES PATENTS

| 2,957,034 | 10/1960 | Eschard | 260—666A |
| 3,151,173 | 9/1964 | Nyce | 260—666 |
| 3,347,944 | 10/1967 | Fritz et al. | 260—666 |
| 3,214,483 | 10/1965 | Cripps | 260—666 |

OTHER REFERENCES

N. P. Sapov, J. Gen. Chem. U.S.S.R., vol. 25, pp. 2035–2042, 1955.

DELBERT E. GANTZ, Primary Examiner

V. O'KEEFE, Assistant Examiner